Sept. 16, 1941.  D. I. CRITOPH ET AL  2,256,424
PROJECTOR
Filed Sept. 9, 1938  5 Sheets-Sheet 4
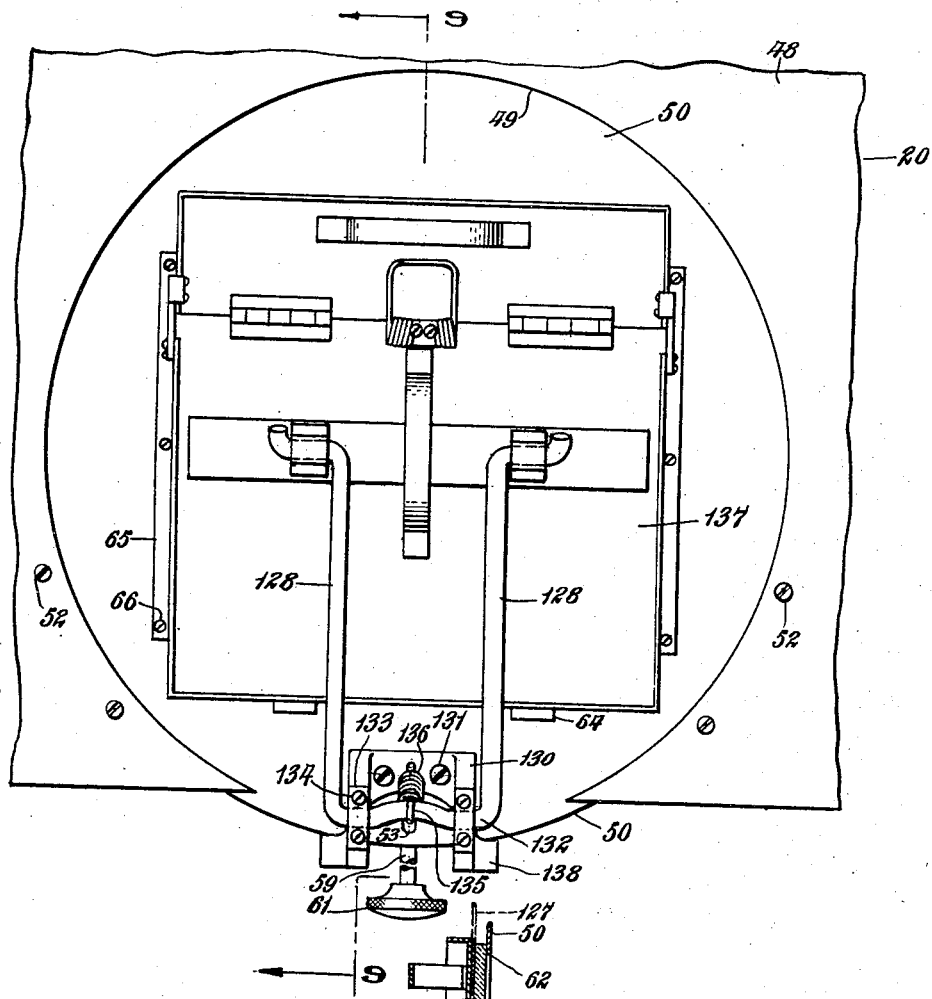

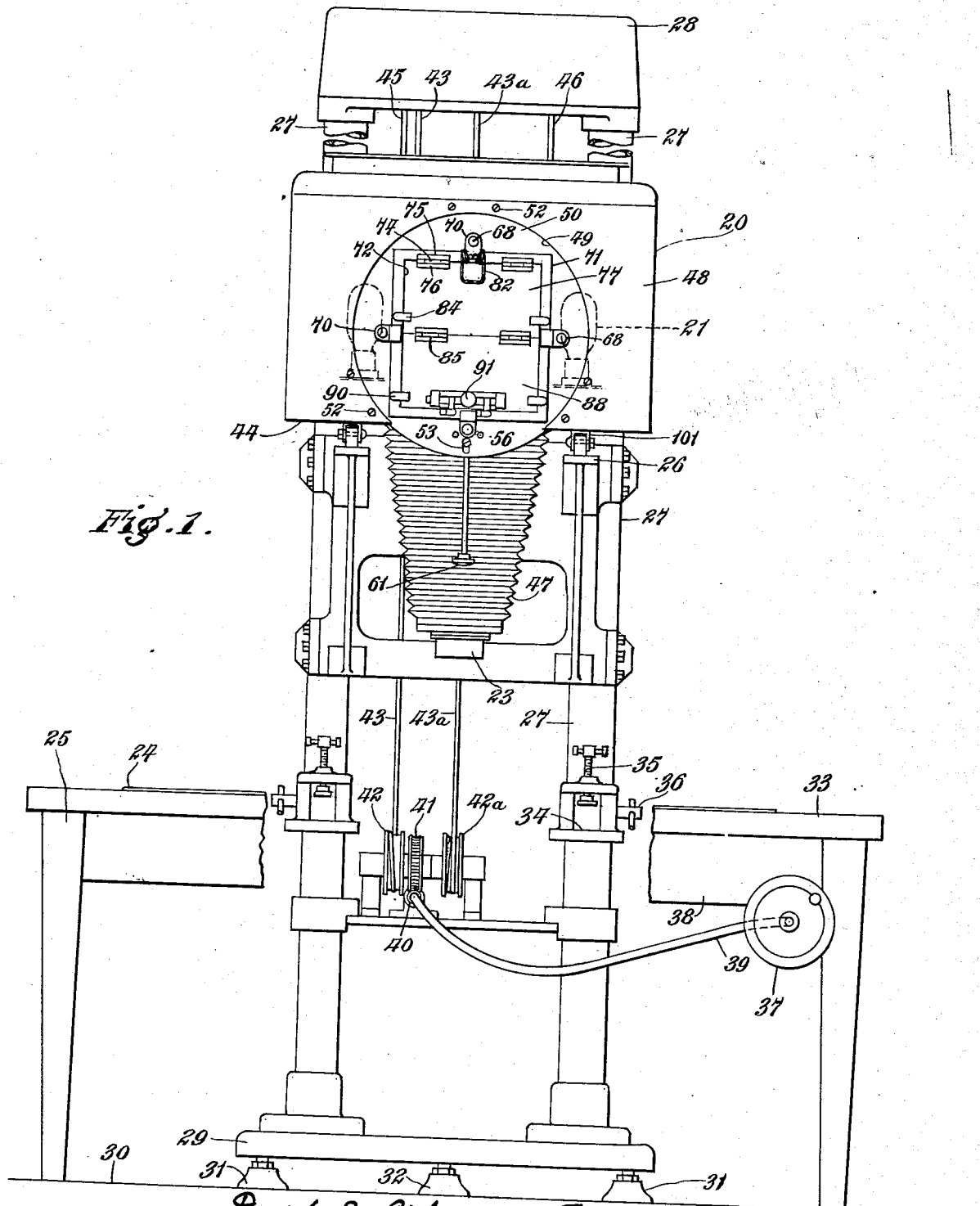

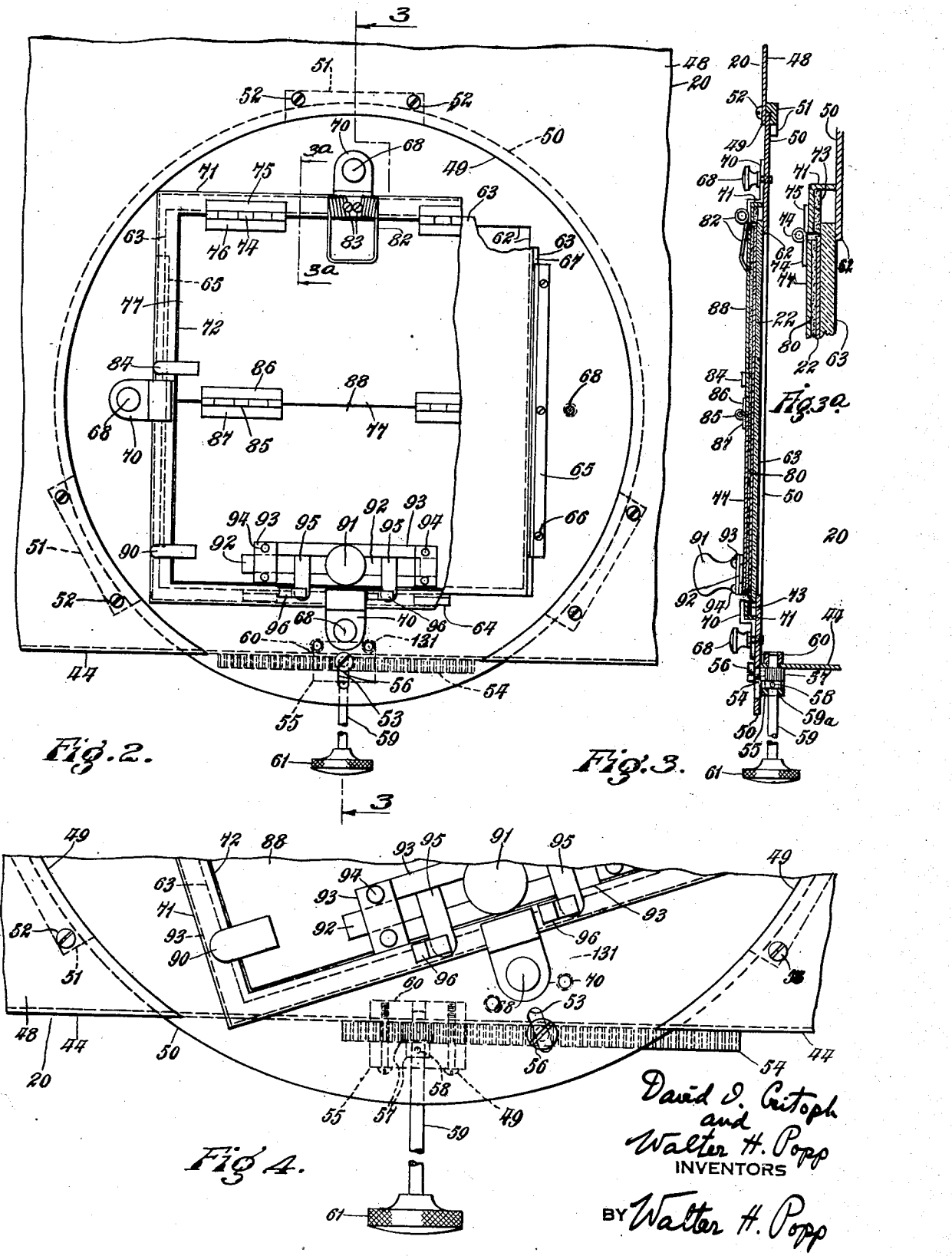

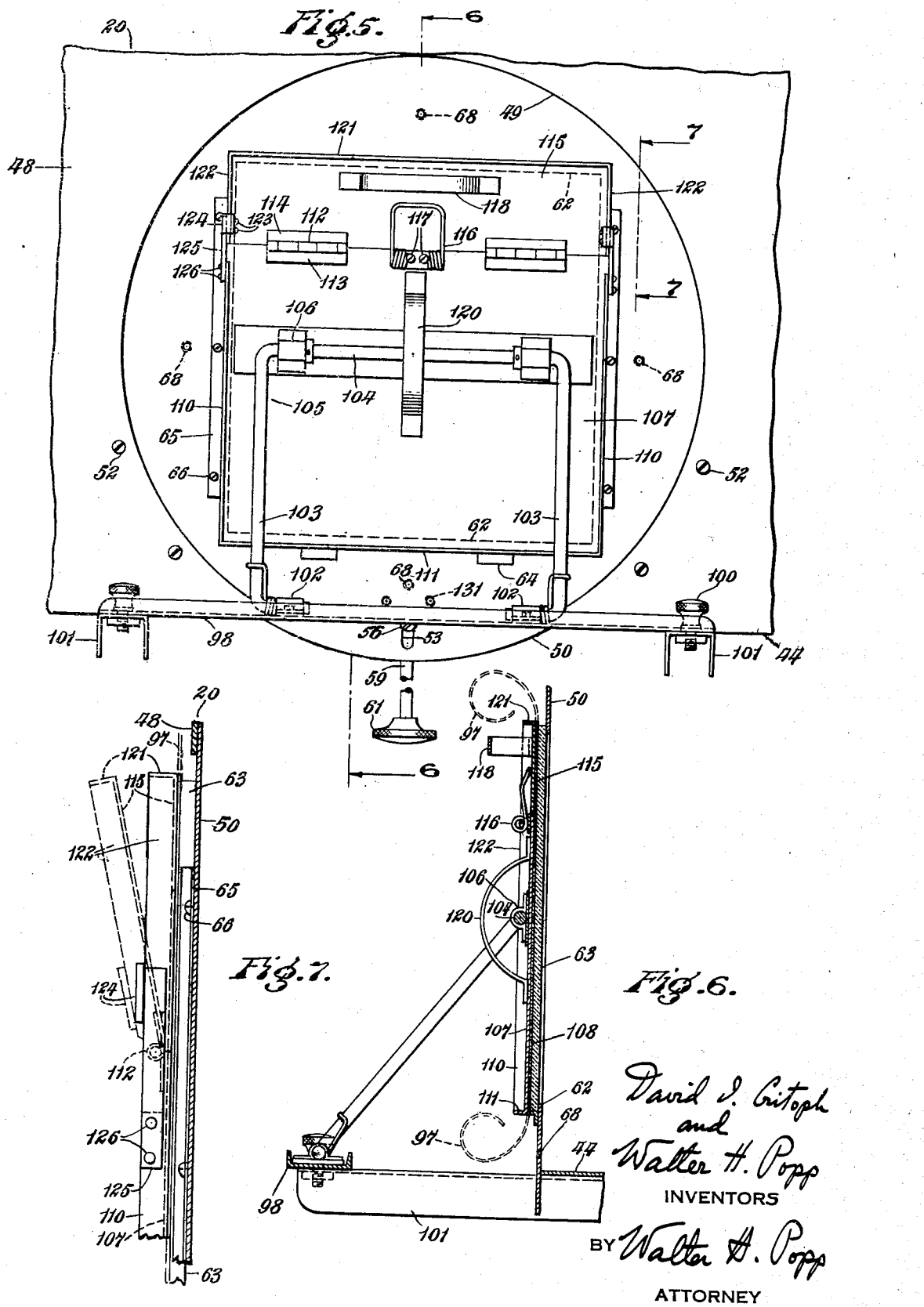

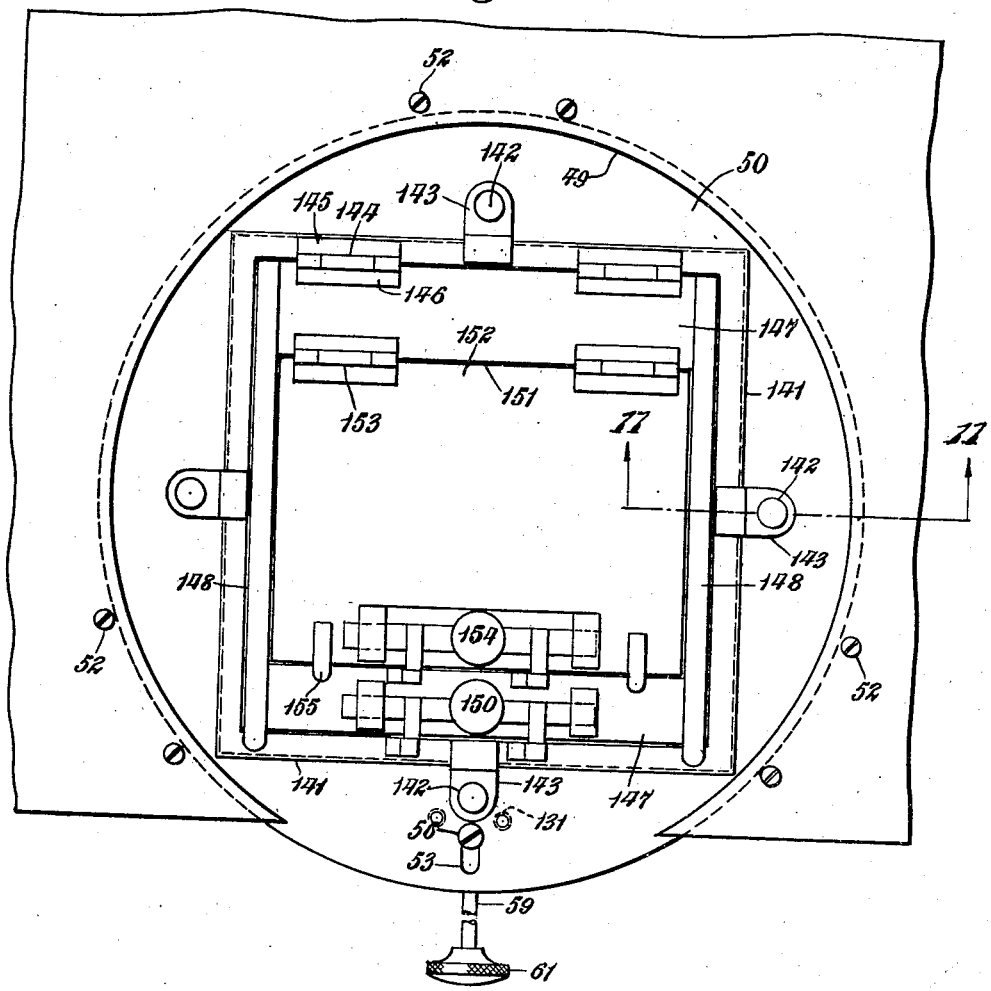
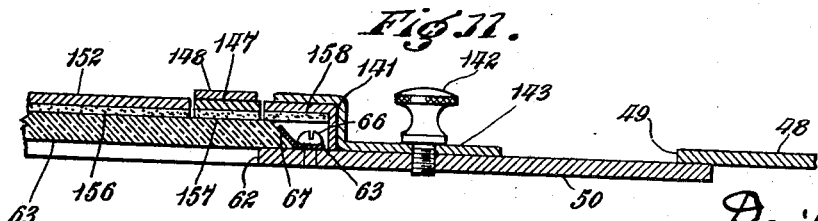

Patented Sept. 16, 1941

2,256,424

UNITED STATES PATENT OFFICE 2,256,424

PROJECTOR

David I. Critoph and Walter H. Popp, Buffalo, N. Y., assignors to Spencer Lens Company, Buffalo, N. Y., a corporation of New York Application September 9, 1938, Serial No. 229,160

4 Claims. (Cl. 88—24)

This invention relates to a projector, and more particularly to an opaque projector for projecting either an enlarged or a reduced image of an aeronautical photograph or a map upon a sheet of drawing paper, so that the draftsman is enabled to trace upon said drawing paper whatever features of the photograph or map that may be desired.

The principal object of the invention is to provide a reliable and yet inexpensive projector in which photographs or maps of different size or character may be quickly placed in approximately correct position for projection and thereafter accurately oriented with respect to whatever reference points may have been previously located on the drawing paper or on the projector itself. Numerous other objects of the invention and practical solutions thereof are described in the following specification and illustrated in the attached drawings, wherein:

Fig. 1 is a diminutive front elevation of our improved projector showing the same attached to such a typical form of drafting table as it is adapted to be used with.

Fig. 2 is a fragmentary front elevation of one form of framing device used with the projector.

Fig. 3 is a fragmentary vertical section through said framing device taken on line 3—3 of Fig. 2.

Fig. 3a is an enlarged fragmentary detail of said framing device taken on line 3—3 Fig. 2.

Fig. 4 is an enlarged fragmentary front elevation of said framing device showing the same in swiveled position.

Fig. 5 is a fragmentary front elevation of an attachment for the projector constituting a modified form of framing device.

Fig. 6 is a fragmentary vertical longitudinal section thereof, taken on line 6—6 of Fig. 5.

Fig. 7 is an enlarged fragmentary vertical section thereof, taken on line 7—7 of Fig. 5.

Fig. 8 is a fragmentary front elevation of still another attachment for the projector constituting another modified form of framing device.

Fig. 9 is a fragmentary vertical section thereof, taken on line 9—9 of Fig. 8.

Fig. 10 is a fragmentary front elevation of another attachment for the projector constituting another modified form of framing device.

Fig. 11 is an enlarged fragmentary horizontal section thereof, taken on line 11—11, Fig. 10.

Similar characters of reference indicate like parts throughout the several figures of the drawings.

It is to be understood that the present invention is not confined to the constructions shown on the accompanying drawings, but that the latter are merely illustrative of the invention and that the scope of the invention is only limited by the scope of the appended claims.

Figs. 1-4

In its general organization, the present invention consists of a rectangular box or casing 20 in which are arranged a pair of electric light bulbs 21 which illuminate the vertical photograph or other representation 22 which is to be projected. The image of this representation 22 is reflected in the usual and well known manner through a suitable objective 23 and upon the upper surface of the drawing paper 24 which is placed upon the upper surface of the drafting table 25. Said casing 20 is vertically adjustable relatively to said table 25 by being mounted on a pair of brackets 26, which are vertically slideable upon a pair of upright pillars 27. The latter are connected together at their upper ends by a hollow cap 28 and connected together at their lower ends by a base plate 29 which is supported upon the floor 30 by two adjustable rear feet 31 and an adjustable front foot 32. To prevent the table 25 from shifting laterally relatively to the projector, the horizontal top 33 of the table is secured to a pair of slide clamps 34 by means of clamp screws 35. The vertical position of said slide clamps 34 is rendered vertically adjustable on the pillars 27 by means of suitable set screws 36.

Vertical adjustment of the casing 20 is effected by a hand wheel 37 which is journaled in a suitable member (not shown) which is clamped to the lower flange 38 of the table 25 and is connected through a flexible shaft 39 with a worm 40. The latter is adapted to drive a worm wheel 41 which is connected to a pair of cable drums 42 and 42a. Wound upon these drums in reverse directions is a hoisting cable 43 and a lowering cable 43a. These cables are suitably connected with the casing 20 through the intermediary of suitable pulleys (not shown) in the hollow cap 28 in the usual and well known manner. The weight of said casing 20 and the parts which move therewith are suitably counter-balanced in any suitable manner such as, for instance, by means of the cables 45 and 46 which are connected with suitable counter-weights arranged in the hollow pillars 27.

Focusing of the objective 23 relative to the casing 20 may be effected in any suitable manner not deemed necessary to be illustrated in the present patent. Light passing from the casing 20 down through the objective 23 is prevented from being interfered with by the usual form of tapered accordion type of bellows 47.

Formed in the front vertical wall 48 of the casing 20 is a circular aperture 49. Arranged against the inner face of said vertical front wall 48 is a swivel head 50 which is of disc shape and has a diameter somewhat larger than the diameter of the aforesaid aperture 49. This swivel head is rotatably secured in position on said front wall 48 by three L shaped cleats 51 which are secured to said front wall 48 of the casing 20 by cap screws 52 or otherwise. Formed in the lower part of said swivel head 50 is a short radial slot 53. Arranged behind the rear face of said swivel head 50 and below the bottom face of the bottom wall 44 of the casing 20 is a thrust bar which is preferably in the form of a rack 54. The latter is arranged in a suitable guide block 55 which is fastened by bolts 49 or otherwise secured to the bottom face of the bottom wall 44 of the casing 20. This arrangement permits said rack to move longitudinally and horizontally in the one or other direction against the bottom face of the bottom wall 44 of the casing 20. Secured to said rack 54 is a shouldered cap screw 56 whose shank is received within aforesaid slot 53 of the swivel head 50. Actuation of said rack in the one or other direction is effected by pinion 57 whose hub is secured by a pin 58 or otherwise to a vertical swivel shaft 59. The latter is suitably journalled at 59a below the pinion 57 in aforesaid guide block 55 and is journaled above said pinion in a bearing block 60 bolted by bolts 49 to the bottom wall 44 of the casing. Secured to the lower end of said swivel shaft 59 is an actuating knob 61 whereby the operator is enabled to conveniently turn said swivel shaft 59 in the one or other direction and to thereby move the rack 54 in the one or other direction and to thereby swing, when desired, the swivel head 50 to some such position as that shown in Fig. 4. The main advantage of this feature of the invention is that circular movement of the swivel head 50 is effected by means of a straight rack 54 and its associated parts rather than by some relatively expensive circular gear construction.

Formed in the central part of the swivel head 50 is a rectangular aperture 62. Arranged against the front face of said swivel head 50 in register with said aperture 62, and having dimensions somewhat larger than the same, is a transparent plate 63. The latter rests upon a pair of L shaped ledges 64 and is held in position by a pair of side cleats 65 which are secured to the front face of the swivel head by screws 66 and, as best shown in Figs 11 and 2, and are bent forwardly and inwardly to engage the beveled side faces 67 of the transparent plate 63.

Secured by detachable thumb screws 68 to the front face of the swivel head 50 are a plurality of clips 70 whose inner ends are bent forwardly and then inwardly and are welded to the front face of a rectangular, open-faced frame 71. The latter is of L shaped cross section as best shown in Fig. 3a, and has a central square aperture 72 which is adapted to register with the rectangular aperture 62 of the swivel head 50. This frame 71 does not bear directly against the front face of the transparent plate 63 but has a suitable felt gasket 73 interposed therebetween as best shown in Fig. 3a.

At the upper part of rectangular square frame 71 is welded a pair of hinges 74 whose upper leaves 75 are welded to said rectangular frame 71 and whose lower leaves 76 are welded to the upper edge of a rectangular primary holding plate 77. The photograph or other representation 22 being projected is adapted to be disposed between the front face of the transparent plate 63 and the rear face of said primary holding plate 77. A suitable resilient gasket 80 is preferably cemented to the rear face of said primary holding plate 77 so as to effect a soft uniform pressure of said primary holding plate upon the photograph or other representation 22. Said primary holding plate 77 is adapted to be resiliently urged toward the transparent plate 63 by means of a suitable spring 82 whose lower arm bears against the upper outer face of the primary holding plate 77 and whose upper end is suitably dually curled to provide the required resilience and is secured by cap screws 83 to the uppermost of the clips 70. Excessive movement of said upper holding plate 77 toward the transparent plate 63 is prevented by a pair of limiting lugs 84 whose inner ends are welded or otherwise suitably secured to the front face of said primary holding plate 77 and whose outer ends project beyond the outer edges of said primary holding plate and are adapted to engage the front face of the frame 71. This prevents the momentum of the primary holding plate 77 from breaking the transparent plate 63 in the event that said primary holding plate is allowed to snap down too suddenly to its closed position which is shown in the drawings.

Arranged at the lower end of the primary holding plate 77 is a pair of hinges 85 whose upper leaves 86 are welded or otherwise secured to the lower edge of said primary holding plates 77, and whose lower leaves 87 are welded or otherwise secured to the upper edge of a secondary holding plate 88. The latter is provided at its side edges with a pair of outwardly extending, limiting lugs 90 which prevent fracture of the transparent plate 63 in the same manner as afore-described limiting lugs 84. Arranged at the lower central part of the secondary holding plate 88 is a latch 91. This latch consists of a slide bar 92 which is slideably arranged in a frame 93 which is secured to the lower holding plate 88 by means such as the rivets 94. Projecting laterally downwardly from said slide bar 92 is a pair of fingers 95 which are adapted to slide under and be engaged by a pair of tongues 96 whose left ends are secured by welding or otherwise to the front, vertical, outer face of the rectangular frame 71. By opening the latch 91 and the secondary holding plate 88 the operator is enabled to push the representation 22 to whatever position may be desired, said representation being in the meantime resiliently held in place by the upper or primary holding plate 77 and its spring 82. When the representation 22 is to be either put into position or taken out of the projector, both the secondary holding plate 88 and the primary holding plate 77 are opened up by being swung about the upper hinges 74 as a pivot.

With this construction the standard sized photograph or other representation being projected may be placed in approximately correct alignment by pushing it against the transparent plate 63 within the inner boundaries of the rectangular gasket 73 of the frame 71. The draftsman then drops the primary holding plate 77 into position and this by means of spring 82 resiliently holds the representation in place while he holds the secondary holding plate 88 open and is thereby enabled to shift the representation 22 until it is in exact alignment with whatever reference marks on the transparent plate or on the drawing paper 24 are being used. The secondary holding plate 88 is then latched with its latch 91. The draftsman then traces upon the drawing paper 24 whatever features of the photograph are desired.

*Figs. 5-7*

If the thumb screws 68 afore-described be removed, the frame 71 together with its primary and secondary holding plates 77 and 88 and its other appurtenances, may be entirely removed. This enables the same to be replaced by the framing device shown in Figs. 5–7 which is particularly adapted to receive such a representation as the large map 97 indicated by dotted lines in Fig. 6. In this construction a supporting bar 98 is attached by means of thumb screws 100 to a pair of channel bars 101 which are secured to the top face of the brackets 26 and project horizontally and forwardly therefrom. In actual practice these thumb screws 100 are identical with the thumb screws 68 of Figs. 1–4 but different numbers have been applied to these screws in Figs. 5–7 so as to avoid any possibility of confusion in reading the drawings. Secured to the central upper face of said supporting bar 98 is a pair of bearings 102 in which are journaled the lower ends of a pair of legs 103 which, together with their integral cross tie member 104, constitute a pressure arm 105. The upper end of the latter is pivoted at 106 to the central part of the primary holding plate 107. The latter has a smooth, unobstructed, rear face, as best shown in Fig. 6, to which is preferably applied a rectangular shaped piece of felt or gasket 108. To render this primary holding plate 107 sufficiently stiff it is preferably provided on its lateral edges with a pair of flanges 110 and at its lower edge with a stiffening flange 111.

Arranged at the upper part of the primary holding plate 107 is a pair of hinges 112 whose lower leaves 113 are welded to the upper edge of said primary holding plate 107 and whose upper leaves 114 are welded to the lower edge of a secondary holding plate 115. Said secondary holding plate is resiliently urged to rotate relatively to said primary holding plate 107 by a spring 116 whose U shaped upper arm engages the rear face of the secondary holding plate 115 and whose lower coiled end is secured by cap screws 117 to the primary holding plate 107. To enable the secondary holding plate 115 to be conveniently grasped, it is preferably provided with a bent, sheet metal handle 118 and the primary holding plate is preferably similarly provided with a bent, sheet metal handle 120.

For purposes of stiffening, the secondary holding plate 115 is preferably provided integrally at its upper edge with a horizontal stiffening flange 121 and at its side edges with a pair of vertical side stiffening flanges 122. Secured by rivets 123 or otherwise to each of said side stiffening flanges 122 is a pair of L shaped limiting lugs 124 which project laterally outward beyond the outer faces of said side stiffening flanges 122. The rear, outer faces of said limiting lugs 124 are adapted to come in contact with the front, outer ends of a pair of limiting bars 125 which are secured at their lower ends by rivets 126 to the side flanges 110 of the primary holding plate 107. This construction prevents a careless operator from allowing the secondary holding plate 115 to snap so violently back as to break the transparent plate 63.

*Figs. 8-9*

This construction is similar to Figs. 5–6 in that it permits of employing representations of large sized representation such as the map 127 indicated by dotted lines in Fig. 9, but it is different in that the thrust arm 128 is pivoted to a bearing block 130 on the swivel head 50 instead of being pivoted to the casing 20. This bearing block 130 is secured by cap screws 131 or otherwise to the lower front face of the said swivel head 50 and has journaled thereon the lower cross bar 132 of said thrust arm 128. This pivotal connection between the thrust arm 128 and the pivot block 130 is preferably of a detachable nature by the employment, for instance, of a pair of bearing clips 133 secured by cap screws 134 to said bearing block. The central part of the cross bar 132 of thrust arm 128 is curved and is pivotally connected at 135 with the lower end of a tension spring 136. This spring is a past-dead-center spring in that when in the position of Figs. 8 and 9 it resiliently urges the primary holding plate 137 toward the transparent plate 63, whereas, when said primary holding plate 137 is swung clear down to its fully opened position, the lower end 135 of said tension spring 136 swings past the axis of the cross bar 132 of the thrust arm 128 and is thereby enabled to resiliently hold the primary holding plate 137 in its open position. When said primary holding plate 137 is in its completely open position, it is prevented from moving any further by reason of a pair of ledges 138 which are integrally formed with the bearing block 130 and project laterally and horizontally outwardly therefrom and are adapted to engage the lower ends of the thrust arm 128. Excessive movement of the primary holding plate 137 relatively to the thrust arm 128 in a counter-clockwise direction (as seen in Fig. 9) is prevented by a pair of limiting fingers 140 which are formed by bending upwardly and outwardly the upper, outer ends of the thrust arm 128.

*Figs. 10-11*

In commercial practice it frequently happens that a projector has to be used with two different sizes of representations. When these two sizes are of standard size the construction shown in Figs. 10 and 11 may be used to advantage. In this case an open-faced, rectangular frame 141 is secured to the swivel head 50 by means of thumb screws 142, the latter engaging clips 143 which are welded at their inner ends to said frame 141. Arranged at the upper end of said frame is a pair of hinges 144 whose upper leaves 145 are welded to said frame 141 and whose lower leaves 146 are welded to an open-faced, primary holding plate 147. The latter has welded or otherwise secured to its lateral edges a pair of limiting bars 148 which stiffen said primary holding plate and, in addition, project horizontally, downward beyond its lower edge and act as limiting lugs by engaging with the front, lower face of the frame 141. Said primary holding plate 147 is adapted to be held in its closed position by a suitable latch 150 which is similar to the latch 91 of Figs. 1-4. The central part of said primary holding plate 147 is cut away to form a rectangular aperture 151. A secondary holding plate 152, having the same configuration as, but slightly smaller than, said aperture 151, is arranged in said aperture and is pivotally connected to the upper part of the primary holding plate 147 by means of hinges 153. The lower part of said secondary holding plate 152 is provided with a suitable latch 154 whereby it may be firmly held in position with reference to said primary holding plate 147. Any fracture of the transparent plate 63 as a consequence of a too violent closing of the secondary holding plate 152 is prevented by a pair of limiting lugs 155 which are welded to the lower, front face of said secondary holding plate 152 and are adapted to engage with the lower front face of the primary holding plate 147. A suitable gasket 156 is cemented to the inner face of the inner or secondary holding plate 152 (as best shown in Fig. 11). Another gasket 157 is cemented to the inner face of the primary holding plate 147 and a similar gasket 158 is cemented to the inner face of the frame 141.

With this construction if the operator of the projector desires to project small sized representations, he opens the latch 154 and swings the secondary holding plate 152 about its hinges 153. These small representations are then approximately aligned by the felt gasket 157 of the primary holding plate 147 and the representation then shifted until it is in exact alignment. If, on the other hand, he is dealing with large sized representations, he does not disturb said latch 154 but, instead, opens the latch 150 and moves the primary holding plate 147, together with the secondary holding plate 152 and its appurtenances, about the hinges 144, thereby exposing a larger area of the transparent plate, so that larger representations can be placed in position, and approximately aligned by the gasket 158 of the frame 141.

It is to be understood that the projector as a whole is not disturbed when using the framing devices of Figs. 1-4, Figs. 5-7, Figs. 8-9, and Figs. 10-11, the desired framing device being applied to the swivel plate 50 or the channel bars 101 of the projector as the case may be. In other words each of these framing devices is an optional accessory of the projector and may be replaced by any one of the others.

We claim:

1. A projector including a casing, a source of illumination and an optical system, an opening in one wall of said casing, a holding plate in said opening, a door in said holding plate for insertion and removal of material to be projected in said projector, and adapted to retain said material in position for projecting the same, said holding plate having a portion overlapping an edge of one wall of said casing, a slot in said overlapping portion, a guide member secured to said casing adjacent said overlapping portion of said holding plate, a thrust bar slidably supported on said guide member, a pinion on said guide member for moving said thrust bar, and a member secured to said thrust bar and extending into the slot in the said overlapping portion of the holding plate, whereby movement of the thrust bar by rotation of the pinion will simultaneously pivot said holding plate.

2. A projector including a casing, a source of illumination and an optical system, an opening in one wall of said casing, a holding plate in said opening, a door in said holding plate for the insertion and removal of material to be projected, and adapted to retain said material in position for projecting the same, said holding plate having a portion overlapping an edge of one wall of said casing, a slot in said overlapping portion, a guide member secured to said casing adjacent said overlapping portion of said holding plate, a thrust bar slidably supported on said guide member, a pinion on said guide member for moving said thrust bar, and a member secured to said thrust bar adjacent the center thereof and extending into the slot in the said overlapping portion of the holding plate, whereby movement of the thrust bar will simultaneously pivot said holding plate.

3. A projector including a casing, a source of illumination and an optical system, an opening in one wall of said casing, a holding plate in alignment with said opening, a door in said holding plate for insertion and removal of material to be projected by said projector, and adapted to retain said material in position for projecting the same, a guide member carried by the casing, a thrust bar slidably supported on said guide member, said holding plate having a portion overlying a portion of said thrust bar, one of said portions having a guideway therein and the other a member extending in said guideway, and means interconnected with said thrust bar whereby movement of said means will cause said thrust bar to move in a direction longitudinally of the guide member and will simultaneously rotate said holding plate.

4. A projector including a casing, a source of illumination and an optical system, an opening in a side wall of said casing, a holding plate member rotatably supported in alignment with said opening, a door in said holding plate member for insertion and removal of material to be projected by said projector, and adapted to retain said material in position for projecting the same, a longitudinally adjustable member supported by said casing, said holding plate member and said longitudinally adjustable member being positioned in adjacent relation with each other with one of said members having a guideway therein and the other member having a projection portion extending in said guideway, and means interconnected with said longitudinally adjustable member whereby movement of said means will cause said adjustable member to move in a longitudinal direction and simultaneously rotate said holding plate member.

DAVID I. CRITOPH.
WALTER H. POPP.